(12) United States Patent
Koralek et al.

(10) Patent No.: US 10,037,520 B2
(45) Date of Patent: Jul. 31, 2018

(54) DRIVE THROUGH ORDER SYSTEM AND VEHICLE DETECTION

(71) Applicant: LD Electronics, Saco, ME (US)

(72) Inventors: Richard W. Koralek, Belfast, ME (US); Richard W. Hale, Saco, ME (US); Luke Saucier, Effingham, NH (US); Brian K. Herbert, Colorado Springs, CO (US)

(73) Assignee: LD Electronics, Saco, ME (US)

( * ) Notice: Subject to any disclaimer, the term of this patent is extended or adjusted under 35 U.S.C. 154(b) by 0 days.

(21) Appl. No.: 15/483,792

(22) Filed: Apr. 10, 2017

(65) Prior Publication Data

US 2017/0300888 A1    Oct. 19, 2017

Related U.S. Application Data

(60) Provisional application No. 62/321,862, filed on Apr. 13, 2016.

(51) Int. Cl.
*G06N 7/02* (2006.01)
*G06Q 20/20* (2012.01)
*G06N 99/00* (2010.01)

(52) U.S. Cl.
CPC .......... *G06Q 20/202* (2013.01); *G06N 7/02* (2013.01); *G06N 99/005* (2013.01)

(58) Field of Classification Search
USPC ........................................... 705/21
See application file for complete search history.

(56) References Cited

U.S. PATENT DOCUMENTS

| | | | | |
|---|---|---|---|---|
| 6,842,719 | B1* | 1/2005 | Fitzpatrick | G06Q 10/06 340/286.09 |
| 2007/0022016 | A1* | 1/2007 | Steres | G06Q 10/06 705/27.1 |
| 2015/0134232 | A1* | 5/2015 | Robinson | G08G 1/0116 701/117 |

* cited by examiner

*Primary Examiner* — Paul Danneman
(74) *Attorney, Agent, or Firm* — Seed IP Law Group LLP

(57) ABSTRACT

A drive through order system having a vehicle detection system that includes at least two sensors, each affixed to an immovable object, a CPU coupled to a computer readable medium containing instructions to process information from the sensors using fuzzy logic and to output an indicator signal reflecting the presence of a vehicle within a volume sensed by the sensors. In some embodiments, a learn mode supports alteration of fuzzy logic processing parameters. In various embodiments, the system is upgradable and sensor types can be changed and/or new sensors added. In some embodiments, fuzzy logic processing information is modified in dependence upon temporal information.

19 Claims, 12 Drawing Sheets

DRIVE THROUGH ORDER SYSTEM AND VEHICLE DETECTION

This application claims the benefit of U.S. Provisional Application No. 62/321,862 filed Apr. 13, 2016.

BACKGROUND

Field

Advancements in sensor processing are needed to provide improvements in performance, efficiency, and utility of use of automobile detection systems in drive through order systems.

Related Art

Unless expressly identified as being publicly or well known, mention herein of techniques and concepts, including for context, definitions, or comparison purposes, should not be construed as an admission that such techniques and concepts are previously publicly known or otherwise part of the prior art. Certain resources including literature directed toward fuzzy logic may be found at https://en.wikipedia.org/wiki/Fuzzy_logic and in other places. Other publication include "Fuzzy Set Theory and its Applications", Second Edition, by H. J. Zimmermann, Kluwer Academic Publishers, 1991, ISBN 0-7923-9075-X; and "Fuzzy Logic Systems for Engineering: A Tutorial", Jerry M. Mendel, Proceedings of the IEEE, Vol. 83, No. 3, March 1995.

SYNOPSIS

The invention may be implemented in numerous ways, e.g. as a process, an article of manufacture, an apparatus, a system, a composition of matter, and a computer readable medium such as a computer readable storage medium (e.g., media in an optical and/or magnetic mass storage device such as a disk, an integrated circuit having non-volatile storage such as flash storage), or a computer network wherein program instructions are sent over optical or electronic communication links. The Detailed Description provides an exposition of one or more embodiments of the invention that enable improvements in cost, profitability, performance, efficiency, and utility of use in the field identified above. The Detailed Description includes an Introduction to facilitate understanding of the remainder of the Detailed Description. The Introduction includes non-limiting Example Embodiments of one or more of systems, methods, articles of manufacture, and computer readable media in accordance with concepts described herein. As is discussed in more detail in the Conclusions, the invention encompasses modifications and variations within the scope of the issued claims.

BRIEF DESCRIPTION OF DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings.

LIST OF REFERENCE SYMBOLS IN DRAWINGS

Figure 1:
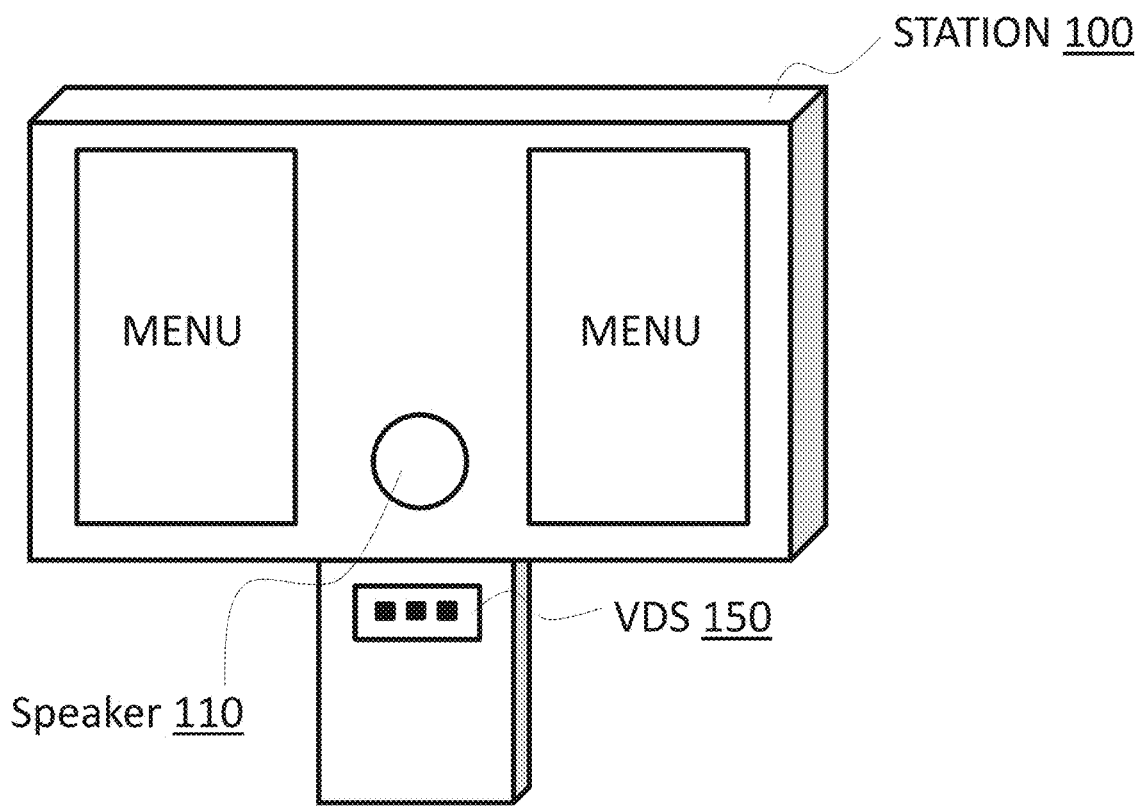
FIG. 1 illustrates selected details of an embodiment of a vehicle detection system (VDS) operating environment employed in providing food, banking, and other services.

| Ref. Symbol | Element Name |
|---|---|
| 100 | Station (Fast Food Order Station) |
| 110 | Speaker |
| 150 | VDS - Vehicle Detection System |
| 210 | Sensor "A" |
| 220 | Sensor "B" |
| 230 | Sensor "C" |
| 300 | Terrestrially Static Sample Volume |
| 400 | Customer Service System |
| 500 | Sensor Data Processing Unit |
| 510 | CPU |
| 520 | Memory |
| 530 | Sensor Interface |
| 540 | User Interface |
| 600 | Procedure For Detecting a Vehicle |
| 610 | Vehicle Detection Start |
| 620 | Acquire Sensor Data |
| 630 | Process Sensor Data |
| 640 | Vehicle detected? |
| 650 | Reset Presence Signal if no detect |
| 660 | Set Presence Signal if detect |
| 700 | Procedure For Employing a Learn Mode |
| 710 | Learning Mode Start |
| 720 | Initialize Fuzzy Logic Processing Parameters |
| 730 | Acquire Sensor Data |
| 740 | Process Sensor Data |
| 750 | Vehicle Detect? |
| 760 | Modify Parameters if no detect |
| 770 | Save Parameters if detect |
| 800 | Procedure For Determining if Sensor Data is Within a Normal Range |

-continued

| Ref. Symbol | Element Name |
|---|---|
| 810 | Sensor Check Start |
| 820 | Acquire Sensor Data |
| 830 | Compare Sensor Data |
| 840 | Sensor Data Within Range? |
| 850 | Alert User if Sensor Data not in Range |
| 860 | Continue Processing if Sensor Data in Range |
| 900 | Procedure For Changing a Sensor Type or Adding an Additional Sensor |
| 910 | Change or Add Sensor Start |
| 920 | Replace or Add Sensor? |
| 930 | If Replacement, Remove Old Sensor |
| 940 | Add New Sensor |
| 950 | Configure Sensor Interface |
| 960 | Update Parameters |
| 1000 | Sensor Data Over Time |
| 1010 | Sensor A Data |
| 1020 | Sensor B Data |
| 1030 | Sensor C Data |
| 1040 | Time t1 |
| 1050 | Time t2 |
| 1100 | Selective Sensor Data Processing Procedure |
| 1105 | Selective Sensor Data Processing Start |
| 1110 | Acquire Sensor Data |
| 1120 | Process Sensor Data |
| 1130 | Detect? |
| 1140 | Set Presence Signal if Detect |
| 1150 | Process Additional Data if No Detect |
| 1160 | Detect w/ Additional Data? |
| 1170 | Reset Presence Signal is no detect |
| 1200 | Procedure For Attaching and Configuring Sensors For Operation With the VDS |
| 1205 | Attach and Configure Sensor Start |
| 1210 | Select Sensors |
| 1220 | Couple Sensors to Sensor I/F |
| 1230 | Select/Download Fuzzy Info |
| 1240 | Calibrate Sensors |
| 1250 | Update Fuzzy Logic Processing Info |

DETAILED DESCRIPTION

A detailed description of one or more embodiments of the invention is provided below along with accompanying figures illustrating selected details of embodiments of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details.

For the purpose of clarity, technical material that is known in the technical fields related to the invention has not been described in detail so that particular details of the invention are not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Acronyms

At least some of the various shorthand abbreviations (e.g. acronyms) defined here refer to certain elements used herein.

| Acronym | Description |
|---|---|
| AC | Alternating Current |
| A/D | Analog to Digital |
| ATA | Advanced Technology Attachment (AT Attachment) |
| CD | Compact Disk |
| CF | Compact Flash |
| CMOS | Complementary Metal Oxide Semiconductor |
| CPU | Central Processing Unit |
| CRC | Cyclic Redundancy Check |
| DAS | Direct Attached Storage |
| DDR | Double-Data-Rate |
| DMA | Direct Memory Access |
| DNA | Direct NAND Access |
| DRAM | Dynamic Random Access Memory |
| DVD | Digital Versatile/Video Disk |
| DVR | Digital Video Recorder |
| ECC | Error-Correcting Code |
| eMMC | Embedded Multimedia Card |
| eSATA | external Serial Advanced Technology Attachment |
| HDD | Hard Disk Drive |
| I/O | Input/Output |
| IC | Integrated Circuit |
| IDE | Integrated Drive Electronics |
| LAN | Local Area Network |
| LIDAR | Light Detection and Ranging |
| NAS | Network Attached Storage |
| NVM | Non-Volatile Memory |
| ONFI | Open NAND Flash Interface |
| OS | Operating System |
| PC | Personal Computer |
| PCIe | Peripheral Component Interconnect express (PCI express) |
| PDA | Personal Digital Assistant |
| PHY | PHYsical interface |
| POS | Point Of Sale |
| RADAR | Radio Detection and Ranging |
| SAS | Serial Attached Small Computer System Interface (Serial SCSI) |
| SATA | Serial Advanced Technology Attachment (Serial ATA) |
| SCSI | Small Computer System Interface |
| SD | Secure Digital |
| SDPU | Sensor Data Processing Unit |
| SRAM | Static Random Access Memory |
| SSD | Solid-State Disk/Drive |
| TSSV | Terrestrially Static Sample Volume |
| UFS | Unified Flash Storage |
| USB | Universal Serial Bus |
| WAN | Wide Area Network |

A number of services employ detection of the presence of a person or vehicle. Services include, but are not limited to, fast food restaurants, traffic lights, parking garages, pedestrian crossings, toll booths, automated car washes, drive-up banking and pharmacies. Depending upon the application, detection of a person or vehicle is employed to initiate order taking, issuance of parking and toll tickets, triggering of cross walk signals, or other services. The term VDS (Vehicle Detection System) is employed herein to refer to various embodiments operable to detect a person or vehicle. Various embodiments disclosed herein provide highly accurate detection of a person or vehicle, reducing the likelihood of a false positive (indication that a person or vehicle is present when neither is present) and false negatives (failure to produce an indication when a person or vehicle is present.) False positives may result in drivers ignoring crosswalk signals if false positives occur frequently. False positives in human staffed drive-up services may result in employee complacency and frustration. False negatives may result in delays in service, reducing overall throughput and possibly reducing customer satisfaction.

A common type of vehicle detector is an inductive-loop. Such detectors can detect vehicles passing or arriving at a certain point, for instance approaching a traffic light or in motorway traffic. An insulated, electrically conducting loop is typically installed in the pavement. The electronics unit typically transmits energy into the wire loops at frequencies between 10 kHz to 200 kHz, depending on the model. An inductive-loop system behaves as a tuned electrical circuit in which the loop wire and lead-in cable are the inductive elements. When a vehicle passes over the loop or is stopped within the loop, the vehicle changes the inductance of the circuit, which changes the resonant frequency. An electronics unit senses the change in frequency and generates an output signifying the passage or presence of a vehicle. Typically, only metal amounts above a certain size are capable of triggering the detector. This often results in bicycles, scooters, and motorcycles stopped at intersections not being detected. These loops also have a serious reliability problem, with breaks in the loop (rendering it unusable) being common. Repair of detection loops can be very expensive, requiring cutting into the pavement.

Introduction to Embodiments

Various embodiments employ a plurality of sensors. Sensors may be affixed to static structures or surfaces of immovable objects. Exemplary static structures and immovable objects include but are not limited to buildings, stationary and substantially stationary structures such as kiosks, order stations, teller machines, posts, permanent and semi-permanent trailers, and toll booths, for example. Sensors include, but are not limited to, inductive sensors, laser light sensors, microwave detectors, microphones, ultrasonic sensors, light sensors, cameras, infrared sensors, and pressure sensors, for example. Each type of sensor typically has limitations associated therewith. As previously described, inductive sensors have limited ability to detect objects with low metal content. Laser and other optical sensors are susceptible to attenuation through fog and smoke, and also dust and dirt that can accumulate on the sensor. Infrared sensors may provide unreliable results if, for example, a vehicle has a surface temperature close to the ambient background temperature. Microwave sensors may experience interference from other RF sources such as CB radios and radar detectors, for example. The ranges of detection and orientation of the plurality of sensors employed in various embodiments of the VDS define a terrestrially static sample volume (TSSV) in which objects can be reliably detected.

Various embodiments employ fuzzy logic to process one or more signals obtained from the sensor(s) and to produce an aggregate result. Fuzzy logic is well suited to non-Boolean environments where sensor values provide partial indications of vehicle presence. Fuzzy logic processing of sensor information offers a more reliable indication of the presence of a vehicle than simple triggering on a sensor threshold value. In some embodiments, a CPU comprising a portion of the VDS contains one or more specialized hardware functions to perform at least some fuzzy logic operations. In some other embodiments, fuzzy logic processing is performed in software. Fuzzy logic software or program code to utilize fuzzy hardware function comprises a portion of the operating software of the VDS. In some further embodiments, the CPU is implemented as part of a gate array.

Various embodiments comprise at least two sensors, each providing a different sensing capability wherein a first sensor type is selected to provide a more reliable indication of presence in operating conditions that result in less reliable presence indications for a second sensor type. In further embodiments, three or more sensors are used wherein each sensor is selected to accommodate at least some of the operating limitations of one or both of the other sensors. Some various embodiments support a learning mode wherein a plurality of sensors are operatively coupled to a control unit of the VDS and a user input is received that informs the control unit if an object desired to be detected is in the area scanned by the sensors and/or is not in the area scanned by the sensors, allowing the operating software to adjust one or more fuzzy logic processing parameters for one or more of each of the sensor types. In certain embodiments the learning mode is employed to determine the number and type of sensors needed to detect an object and to limit false detections with an acceptable level of reliability. In some embodiments, the operating software identifies at least one sensor that is not functioning in a desired manner and conveys information to a user that the sensor should be cleaned or replaced. In some embodiments, an acceptable level of reliability is at least 70% accuracy, and in other embodiments, an acceptable level of reliability is at or greater than 80%, 90%, 95%, 99% or some other level of accuracy. In still other cases, an acceptable level of accuracy is a user programmable function.

In some further embodiments, the operating software is able to detect reduced functionality in at least one of the sensors (as may occur, for example, due to dust, dirt, fog, direct sunlight, RF noise are any other environmental condition) and adjust the fuzzy logic processing parameters to rely more heavily on sensors without reduced functionality.

In yet some other embodiments, the VDS is operable to provide a partial likelihood signal. This signal can be employed to alert employees (i.e., order takers, managers, workers, local or remote service personnel, or other like users) to check a drive through order station or to prompt a message such as "order when ready", for example.

Various VDS embodiments provide interfaces to memory, sensors, and to a host system. According to various embodiments, some interfaces are compatible with one or more of a USB interface standard, a CF interface standard, an MMC interface standard, an eMMC interface standard, a Thunderbolt interface standard, a UFS interface standard, an SD interface standard, a Memory Stick interface standard, an xD-picture card interface standard, an IDE interface standard, a SATA interface standard, a SCSI interface standard, a SAS interface standard, and a PCIe interface standard. According to various embodiments, the host system is all or any portions of a computer, a workstation computer, a server computer, a PC, a laptop computer, a notebook computer, a netbook computer, a tablet device or tablet computer, an Ultrabook computer, a POS device, a wearable computer, and a cash-register.

Example Combinations

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses modifications and variations within the scope of the issued claims.

EC1) A system comprising:
a CPU;
a plurality of sensors affixed to one or more immovable objects or surfaces and coupled to said CPU;
a computer readable medium storing instructions to be executed by said CPU, said instructions and said CPU operable to perform fuzzy logic processing of signals from said sensors; and
an output signal operable to be activated as a result of said processing.

EC2) The system of EC1, further comprising fuzzy logic processing hardware embedded in said CPU.

EC3) The system of EC1, wherein at least one of the sensors is one of an infrared sensor, an inductive sensor, a LIDAR sensor, a color detector, a microwave sensor, a microphone, a pressure sensor, an ultrasonic ranging sensor, a light intensity detector, a monochrome camera, and a color camera.

EC4) The system of EC1 further comprising an interface compatible with one or more of a USB interface standard, a CF interface standard, an MMC interface standard, an eMMC interface standard, a Thunderbolt interface standard, a UFS interface standard, an SD interface standard, a Memory Stick interface standard, an xD-picture card interface standard, an IDE interface standard, a SATA interface standard, a SCSI interface standard, a SAS interface standard, Ethernet, and a PCIe interface standard.

EC5) The system of EC1 further comprising a wireless interface operable to communicate with a host system.

EC6) The system of EC1, wherein said instructions further comprise a learning mode.

EC7) The system of EC6, wherein said learning mode supports adjustment of one or more fuzzy logic processing parameters to assert a detection signal corresponding to a desired object when said object is placed in an area monitored by said sensors.

EC8) The system of EC6, wherein said learning mode supports adjustment of one or more fuzzy logic processing parameters to not assert a detection signal corresponding to an object when said object is not present in said area monitored by said sensors.

EC9) The system of EC1, wherein said system is user upgradeable in that one or more sensors can be changed and/or one or more additional sensors added.

EC10) The system of EC9, wherein said system comprises program instructions operable to detect the attachment of a sensor that is a replacement sensor, an upgraded sensor, or an added sensor; and wherein said program instructions are operable to access fuzzy logic processing parameters for the sensor that is replaced, upgraded, or added.

EC11) The system of EC1 wherein said instructions are operable to detect faulty operation of at least one sensor and to issue a message to a user.

EC12) The system of EC1 wherein said instructions are operable to alter the rate that data is acquired from one or more of said plurality of sensors.

EC13) The system of EC1 wherein said instructions comprise a timer function operable to place the system in a low power mode during a predefined time during a predefined day of the week.

EC14) The system of EC1 wherein said instructions are operable to acquire and process data from a subset of said plurality of sensors and to process data from remaining sensors not in said subset in dependence on the results from processing data from said subset of sensors.

EC15) The system of EC12 wherein said instructions acquire data from said sensors between one and five times per second.

EC16) The system of EC12 wherein said instructions are operable to increase the rate at which data is acquired from one or more of said plurality of sensors when at least one sensor value is indicative of a vehicle being present in a TSSV.

EC17) The system of EC12 wherein said instructions are operable to reduce the rate at which data is acquired from one or more of said sensors if a vehicle has not been detected for a predetermined amount of time.

EC18) A system comprising:
a central processing unit (CPU);
a memory coupled to said central processing unit and operable to store program instructions for said central processing unit;
a plurality of sensors operatively coupled to said central processing unit;
first program instructions stored in said memory for processing signals from said plurality of sensors, said processing using fuzzy logic; and
second program instructions stored in said memory for processing a customer order.

EC19) The system of EC18, wherein a DC voltage is applied to at least said CPU, said DC voltage produced real-time from a terrestrial AC power source.

EC20) The system of EC18, wherein each of said plurality of sensors is affixed to an immovable object or surface.

EC21) The system of EC18, wherein a DC voltage is applied to at least said CPU, said DC voltage produced from a solar panel affixed to a stationary object or surface, and an associated power controller.

EC22) The system of EC19 or EC21, further comprising a storage device for storing electrical energy.

EC23) The system of EC1, further comprising a wired LAN interface operable to convey said output signal to a host system.

EC24) The system of EC1, further comprising a wired LAN interface operable to upload instructions to said computer readable medium.

EC25) A system comprising:
a drive-thru POS system;
a communications system; and
a VDS operatively coupled to said POS system and/or said communication system, said VDS coupled to a plurality of sensors and operable to process sensor information using fuzzy logic.

EC26) The system of EC25, wherein power for said VDS is derived from a terrestrial AC power source.

EC27) The system of EC25, wherein power for said VDS is provided from a solar panel affixed to a stationary object or surface.

EC28) A system of any of the previous ECs wherein none of the sensors comprise a camera.

EC29) A method of detecting the presence of a vehicle comprising:
  acquiring information from a plurality of sensors, each sensor affixed to an immovable object or surface;
  processing said sensor information using fuzzy logic; and
  asserting a vehicle indicator signal.

EC30) The method of EC29, wherein said vehicle indicator signal is coupled to a POS system and/or a communications system.

EC31) A method of adjusting processing parameters in a fuzzy logic vehicle detection system comprising:
  removing vehicles from a terrestrially static volume sensed by said VDS;
  placing said VDS in a learn mode;
  acquiring first sensor information;
  placing a vehicle in said volume sensed by said VDS;
  acquiring second sensor information; and
  determining a threshold value for at least one sensor based upon said first sensor information and said second sensor information.

EC32) A method of adjusting processing parameters in a fuzzy logic vehicle detection system (VDS) comprising:
  acquiring data values from a plurality of sensors, each sensor affixed to a substantially immovable object;
  comparing said acquired values with stored data values representing a range of values for at each of said plurality of sensors;
  placing said VDS in a learn mode;
  acquiring first sensor information when no vehicle is present in a volume sensed by said VDS;
  placing a vehicle in said volume sensed by said VDS;
  acquiring second sensor information;
  determining a threshold value for at least one sensor based upon said first sensor information and said second sensor information.

EC33) A method of adjusting processing parameters in a fuzzy logic vehicle detection system comprising:
  establishing a LAN connection;
  determining sensors coupled to said detection system; and
  adjusting at least one fuzzy logic processing parameter.

EC34) The method of EC32 where said LAN connection is a wired LAN connection.

EC35) A method of operating a fuzzy logic vehicle detection system comprising:
  acquiring data values from a plurality of sensors, each sensor affixed to an immovable object or surface;
  processing data from a subset of said plurality of sensors;
  determining if a vehicle is present within a volume sensed by said subset of sensors;
  asserting a vehicle indication signal if said determining indicates the presence of a vehicle; and
  processing data from sensors not in said subset if said determining does not indicate the presence of a vehicle.

EC36) A method of operating a customer service system comprising:
  detecting an object, wherein said detecting includes acquiring information from at least one sensor, said at least one sensor affixed to a substantially immovable object;
  processing said information using fuzzy logic; and
  establishing a two-way communication in response to said detecting;

EC37) A method of configuring a customer service system comprising:
  selecting one or more sensors from a list of supported sensor types;
  affixing said one or more sensors to a substantially immovable object; and
  downloading fuzzy processing information for said one or more sensors to said customer service system.

System

FIG. 1 illustrates selected details of an embodiment of a VDS operating environment employed in a drive through order system. Order station 100 comprises menus, a speaker 110, a microphone (not depicted) and VDS 150. VDS 150 comprises a plurality of sensors with at least one sensor affixed to an immovable structure. Sensors need not be arranged as depicted and can be situated in any locations proximate order station 100. Certain embodiments have each sensor positioned in a different location. In various embodiments each of the plurality of sensors can be of any type including all of the same type and all of different types.

Figure 2:
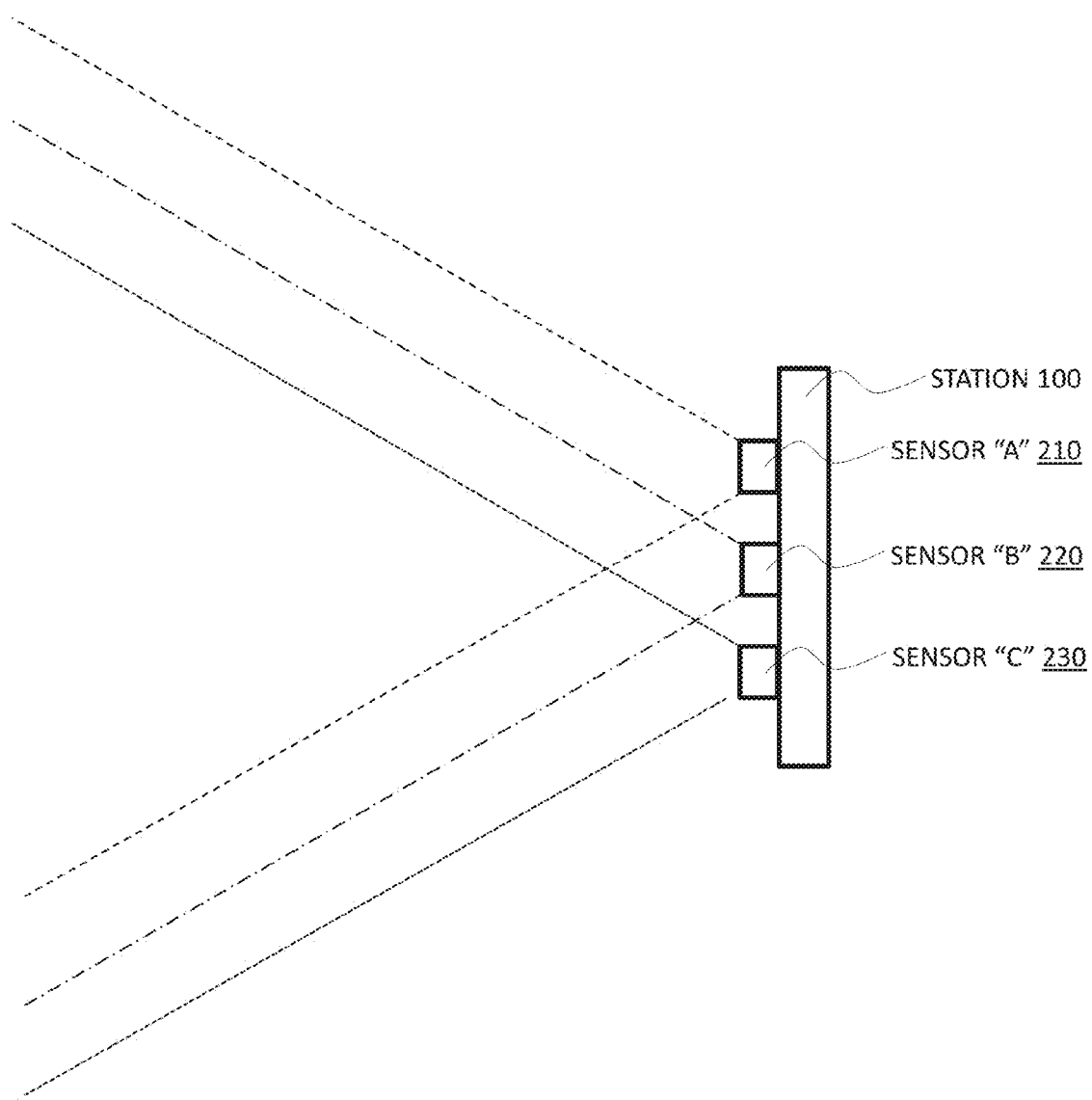
FIG. 2 illustrates selected details of a vehicle detection system (VDS) embodiment comprising three sensors.

FIG. 2 illustrates selected details of a VDS embodiment comprising three sensors. Sensor A 210 is operable to sense objects within a region illustrated by dashed lines. Sensor B 220 is operable to sense objects within a region illustrated by dot-dash line. Sensor C 230 is operable to sense objects within a region illustrated by dotted lines. The region sensed by a sensor typically comprises a volume extending left, right, above, and below away from the face of the sensor. A volume sensed by one or more sensors of various embodiments is termed a terrestrially static sample volume (TSSV).

Figure 3:
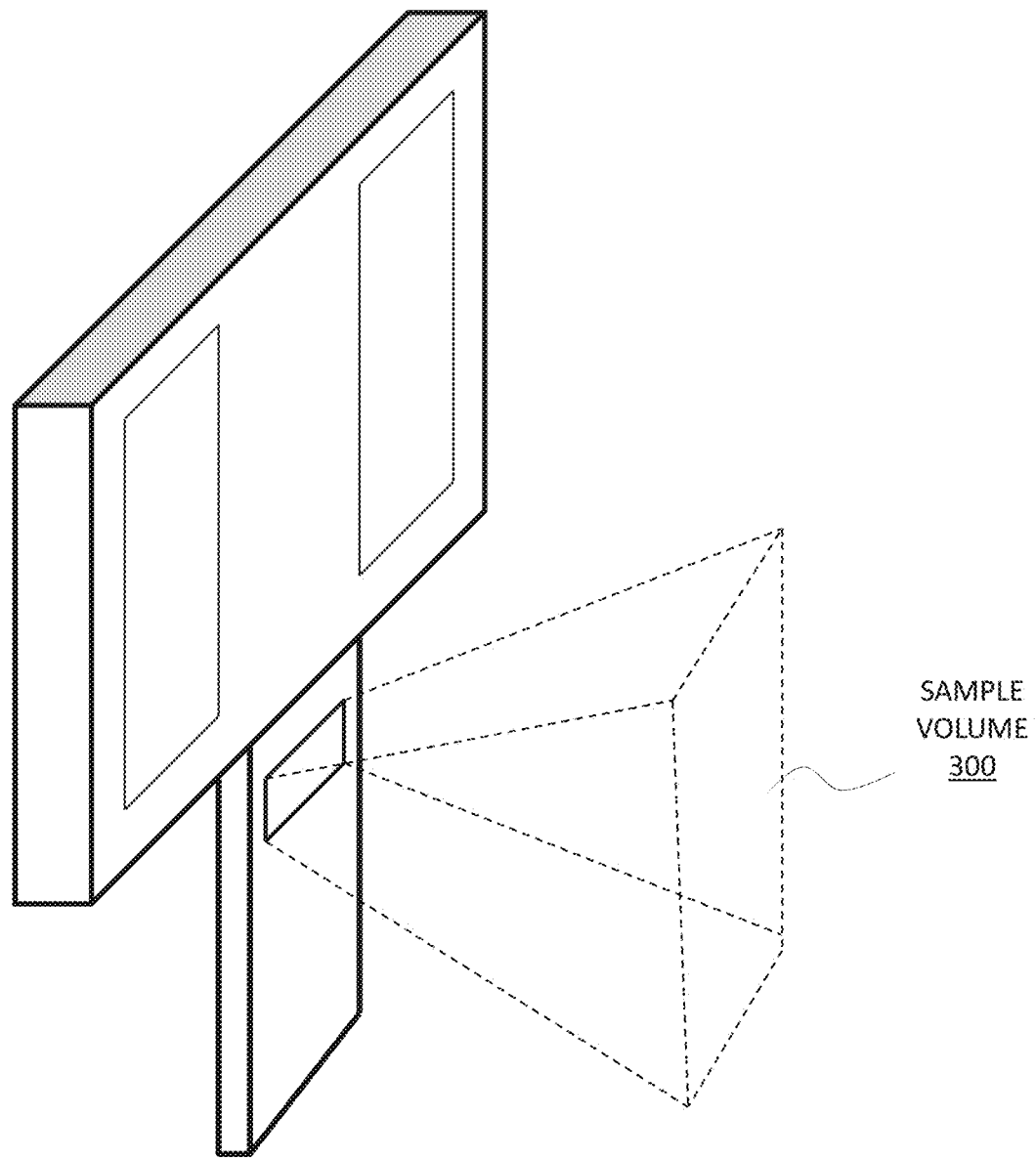
FIG. 3 illustrates selected details of an embodiment comprising a terrestrially static sample volume (TSSV).

FIG. 3 illustrates selected details of an embodiment comprising a TSSV. FIG. 3. is illustrative only and actual volumes differ in size and shape depending on type, placement, and directional orientation of sensors.

Figure 4:
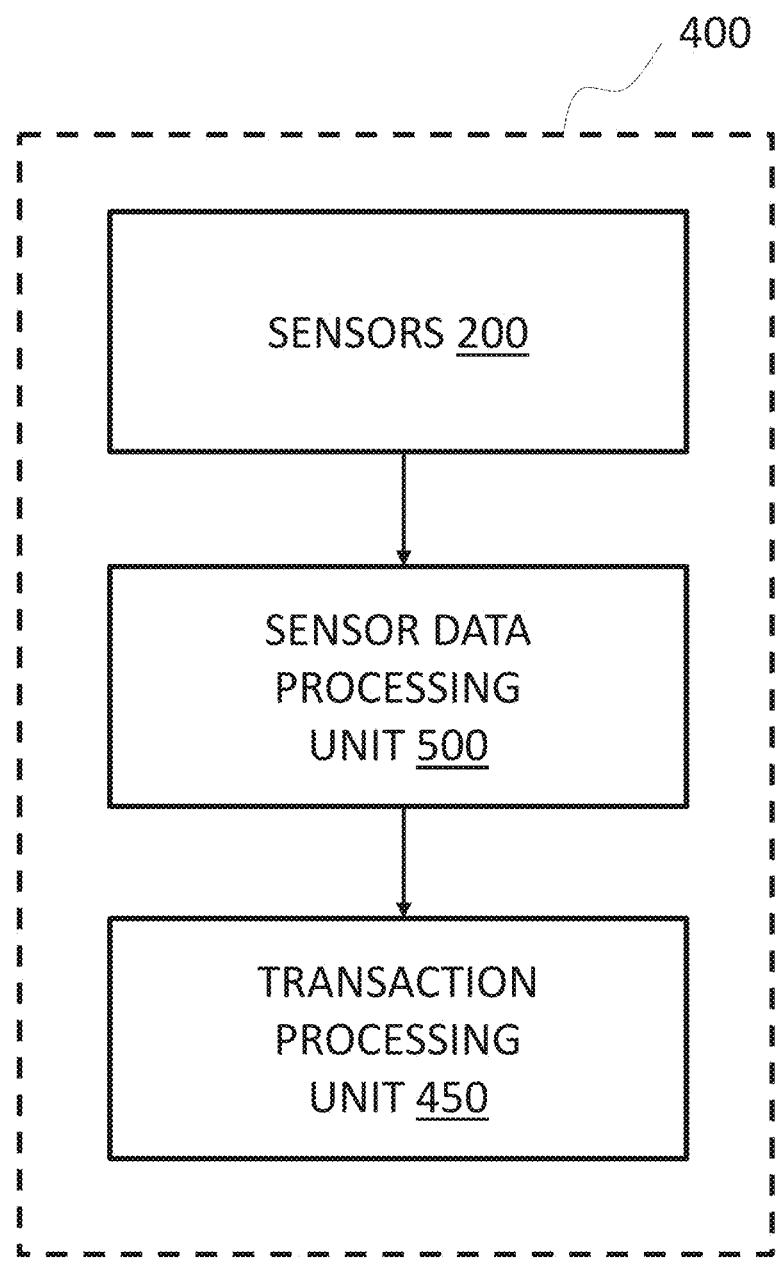
FIG. 4 illustrates selected details of a customer service system employing various embodiments of a VDS.

FIG. 4 illustrates selected details of a customer service system employing various embodiments of a VDS. Customer service system 400 comprises sensors 200, sensor data processing unit (SDPU) 500, and transaction processing unit 450. Sensors 200 comprise a plurality of sensors affixed to a stationary object or surface. Signals from sensors 200 are coupled to SDPU 500. SDPU 500 is operable to process signals from sensor 200 using fuzzy logic and to communicate at least a vehicle detect signal to transaction processing unit 450. Transaction processing unit 450 is exemplary of, but not limited to, fast food order systems, and automated car wash POS terminals, for example. In various embodiments, other signals additionally provide communication between SDPU 500 and transaction processing unit 450. For example, in some embodiments, control and configuration of a VDS is performed through an interface to a fast food order processing system.

Figure 5:
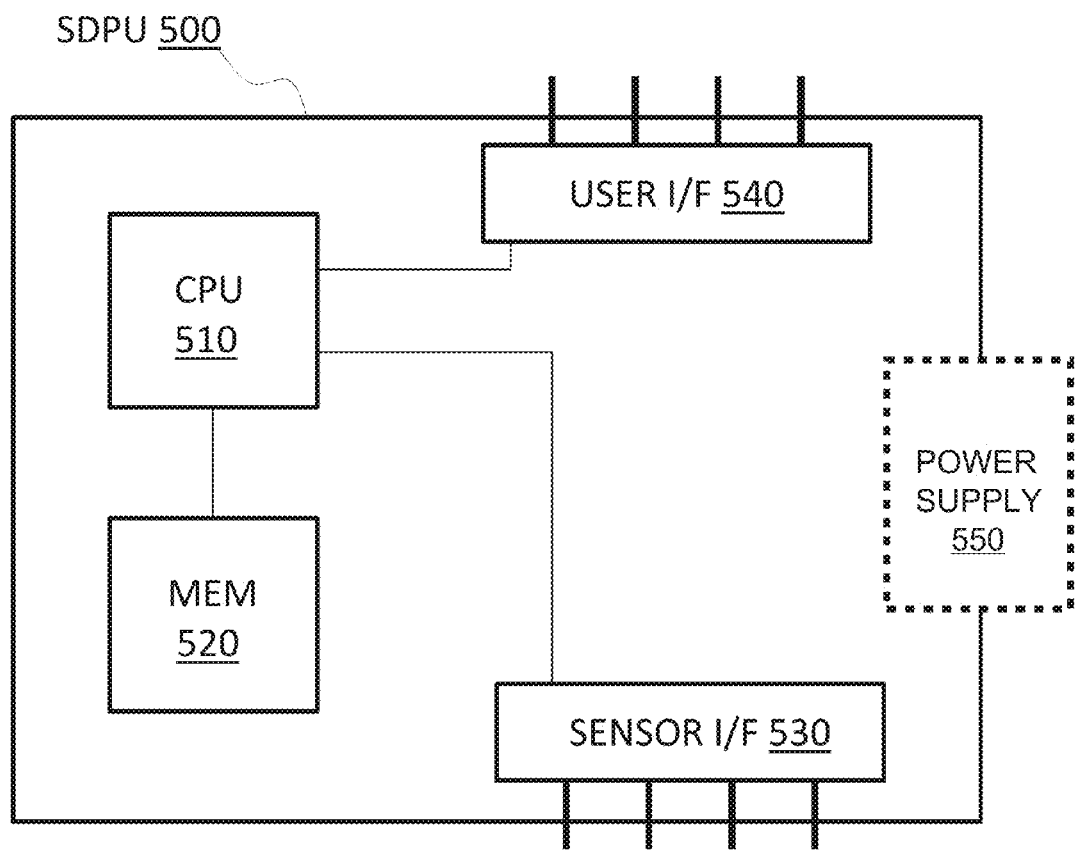
FIG. 5 illustrates selected details of a sensor data processing unit (SDPU).

FIG. 5 illustrates selected details of a sensor data processing unit (SDPU). SDPU 500 comprises a CPU 510, a memory 520, sensor interface 530, and interface 540. CPU 510 is not limited to any particular type of CPU and as previously described, and in various embodiments comprises fuzzy logic processing hardware. Memory 520 is not limited to any specific memory type and comprises one or more types of memory including but not limited to ROM, RAM, Flash, EEPROM, SSDs (Solid State Drives), and hard disks, for example. Memory 520, which may also be referred to as a non-transitory computer readable medium, is operable to store instructions for CPU 510 comprising fuzzy logic instructions for processing of sensor information. Sensor interface 530 is operable to receive signals from a plurality of sensors. Sensor interface 530 is wired, wireless, or a combination of wired and wireless. Wired connection embodiments employ any interface format, including but not limited to USB, I2C, and ethernet, for example. In some embodiments, sensor interface 530 comprises both inputs and outputs, with outputs employed to control sensors and/or to modulate light, acoustic, RF, and/or other stimuli for sensors. Some embodiments of sensor interface 530 comprise one or more of counters, comparators, A/D converters, D/A converters, amplifiers, and the like as required for signal conditioning and conversion of sensor information to digital data. In various embodiments, sensor interface 530 comprises a wireless interface to one or more sensors. The wireless interface(s) are not limited to any type and comprise any near-field wireless format or any wireless LAN format including but not limited to Bluetooth, Zigbee, wireless USB, WIMAX, and versions of 802.11, for example. Interface 540 is operable to communicate a vehicle detect signal (electrically coupled or wireless) to an external system such as, but not limited to, a fast food order system, for example. In some cases, power for the SPDU 500 alone or with other parts of the VDS is provided by a power supply unit 550. The power supply unit 550 may be at least one of a power supply unit coupled to an electrical grid, a power supply unit coupled to a solar panel, a battery unit, or some other type of power source (e.g., a beamed power source, an inductive power source, etc.). In cases where a solar panel is employed, the solar panel may be affixed to a same or a different immovable object as the SPDU 500. In cases where a battery unit is employed, the battery unit may include one or more rechargeable battery cells having a lead-acid composition, a nickel-based composition (e.g., nickel cadmium (NiCd), nickel metal hydride (NiMN)), a lithium-based composition (e.g., lithium ion (Li-ion), lithium ion polymer (Li-ion polymer)), or some other composition.

Figure 6:
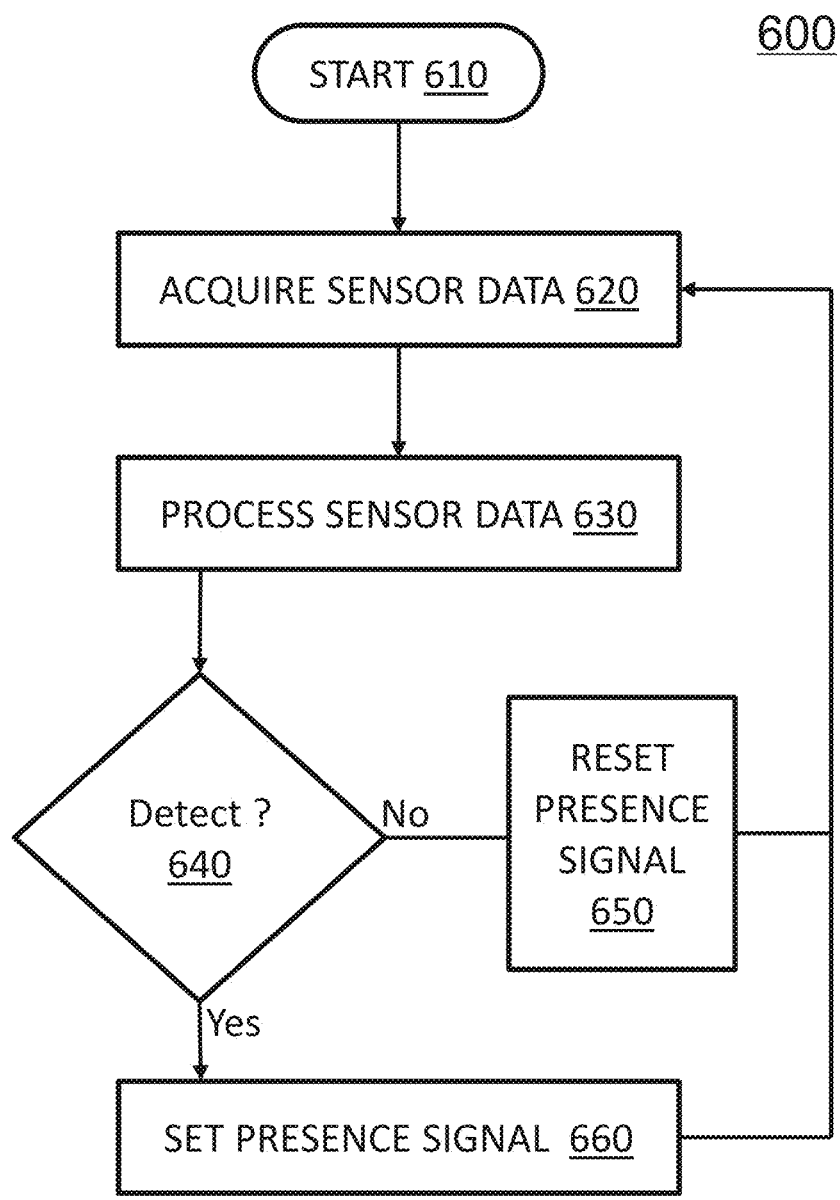
FIG. 6 illustrates, via a flow chart, selected details of an exemplary embodiment of a procedure for detecting a vehicle.

FIG. 6 illustrates, via a flow chart, selected details of an exemplary embodiment of a procedure for detecting a vehicle 600. When CPU 510 accesses a new location in memory 520 containing a detect command, flow begins (Start, 610). Sensor information from a terrestrially static sample volume is acquired (620). Acquisition of sensor information can comprise, but is not limited to, receiving a multi-bit digital value, measuring a frequency supplied on an analog or digital input, and measuring a voltage on an analog input to the SPDU. In some embodiments, acquisition of sensor information comprises activating a stimulus such as, but not limited to, a light source, RF signal, or acoustic signal, for example. Information acquired from one or more sensors is processed employing fuzzy logic (630). A determination is made 640 from the results of said fuzzy logic processing if a vehicle is present. If the determination is that a vehicle is not present, a presence signal is reset (650) and sensor information is again acquired. If the determination is that a vehicle is present, said vehicle presence signal is set (660) and sensor information is again acquired. In some various embodiments, a timer of the drive through order system is started upon assertion (setting) of the presence signal.

Figure 7:
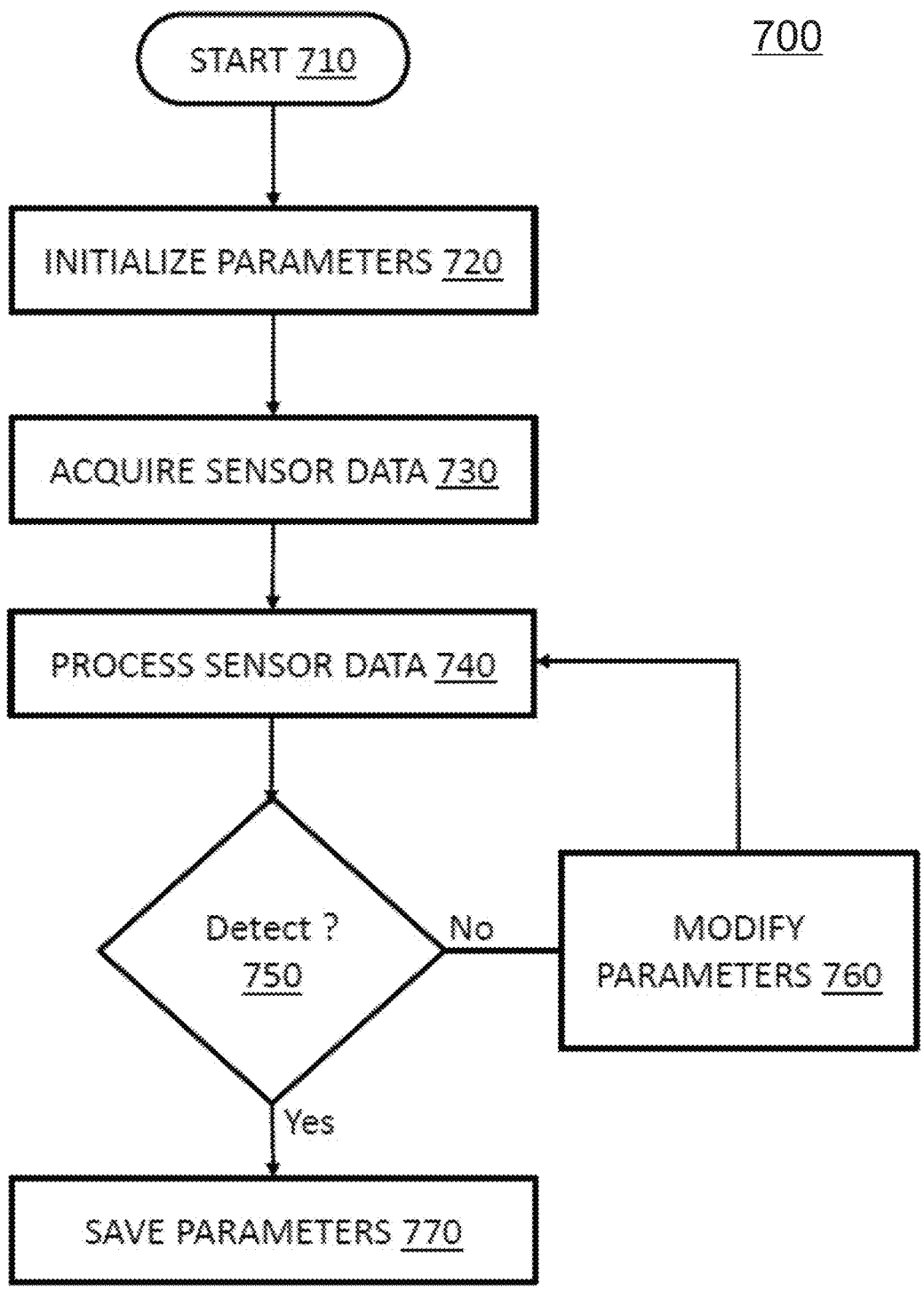
FIG. 7 illustrates, via a flowchart, selected details of an exemplary embodiment of a procedure for employing a learn mode.

FIG. 7 illustrates, via a flowchart, selected details of an exemplary embodiment of a procedure for employing a learn mode 700. When CPU 510 accesses a new location in memory 520 containing a learn command, flow begins (Start, 710). Values stored in memory 520 are employed to initialize at least some of the fuzzy logic processing parameters (720). Sensor information from a terrestrially static sample volume is acquired (730). In some embodiments, acquisition of sensor information comprises activating a stimulus such as, but not limited to, a light source, RF signal, or acoustic signal, for example. Information acquired from one or more sensors is processed employing fuzzy logic (740). A determination is made 750 from the results of said fuzzy logic processing if a vehicle is present. If the result of determination 750 is that no vehicle is present when a vehicle is present, parameters are modified 760 and sensor information is again acquired. If the result of determination 750 is that a vehicle is present, the parameters are stored 770. The procedure of FIG. 7 allows fuzzy logic processing parameters to be tuned to a threshold, reducing the likelihood of false negative detections. In a similar manner, not depicted in the figures, a procedure for adjusting fuzzy logic processing parameters is employed in some embodiments to limit the likelihood of false positive detections. The modification to particular parameters may be performed automatically or manually, for example by entering or otherwise passing one or more updated fuzzy logic processing parameters (e.g., timing parameters, distance parameters, sensor power or sensitivity parameters, or the like) into the memory.

Figure 8:
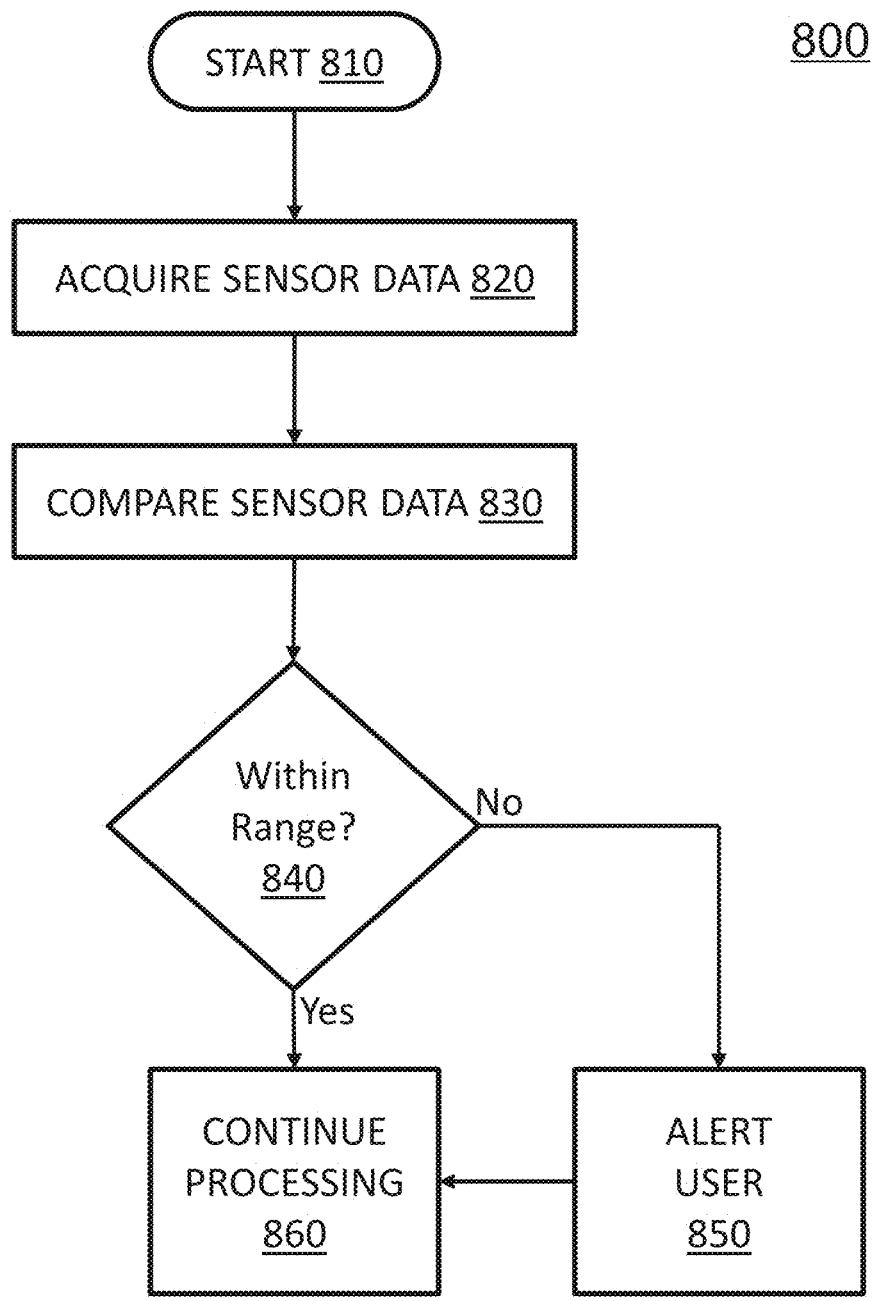
FIG. 8 illustrates, via a flowchart, selected details of an exemplary embodiment of a procedure for determining if sensor data is within a normal range.

FIG. 8 illustrates, via a flowchart, selected details of an exemplary embodiment of a procedure for determining if sensor data is within a normal range 800. Processing in the procedure begins at 810. Sensor data is acquired 820, and the acquired data is compared with a reference value or range of values 830. The reference value can be a static value stored in memory, or can be the result of one or more calculations including but not limited to, an average of a predetermined number of prior readings, or a median of a predetermined number of previous readings, for example. If the result of said comparing 830 is that the value is above a desired threshold or within a desired range, processing continues 860. If the result of said comparing is that the value is below a desired threshold or outside a desired range, an alert is conveyed to a user 850. The alert is not limited in content or format and can comprise a message to clean a sensor, or to replace a sensor, for example.

Figure 9:
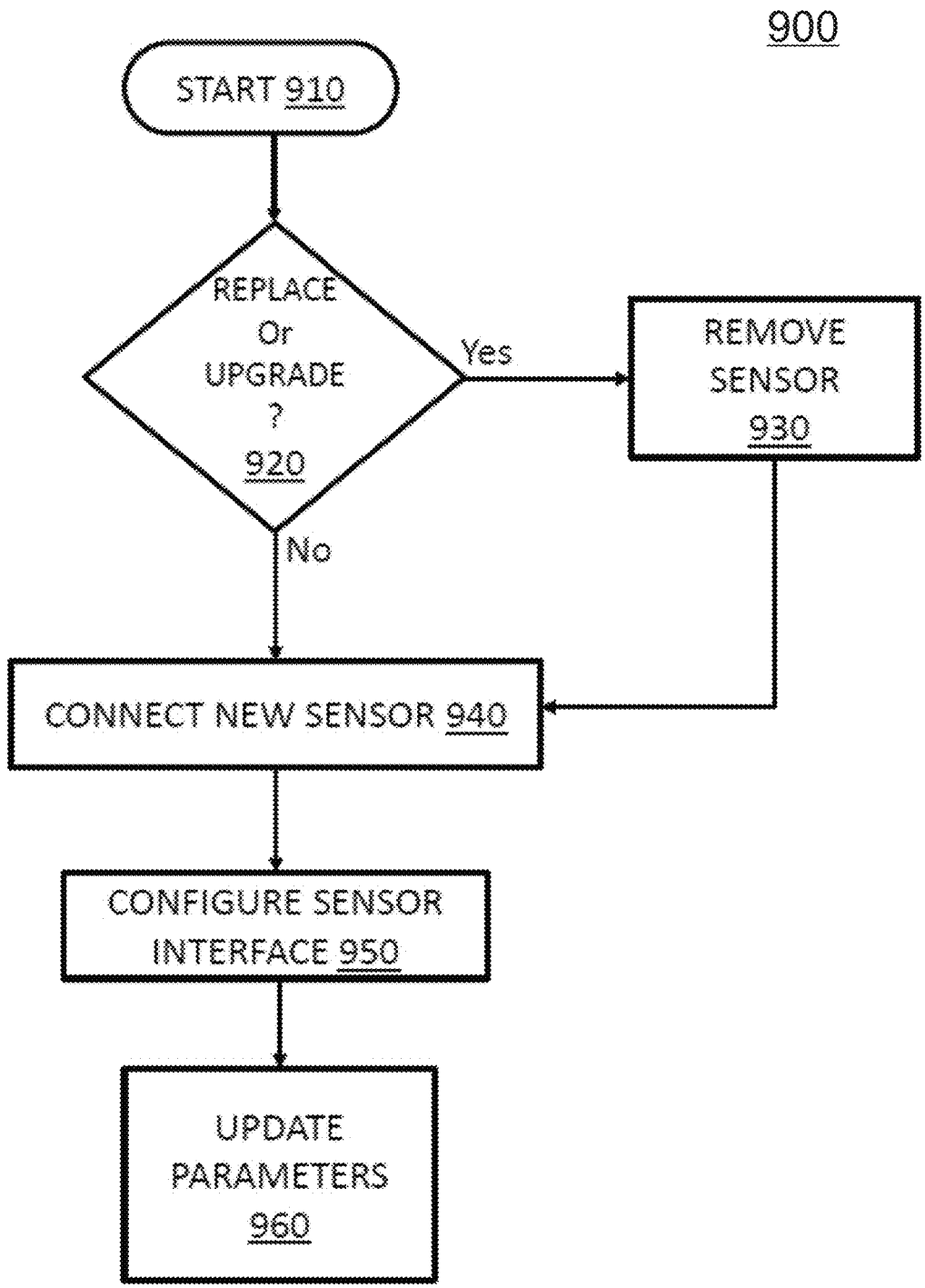
FIG. 9 illustrates, via a flowchart, selected details of an exemplary embodiment of a procedure for changing a sensor type or adding an additional sensor.

FIG. 9 illustrates, via a flowchart, selected details of an exemplary embodiment of a procedure for changing a sensor type or supplanting sensors by adding an additional sensor 900. Depending upon the operating environment of the VDS, original selection of the number and type of sensors, and changes in RF noise, lighting, and other conditions can result in a lower than desired accuracy of detection. Various embodiments support upgrading of one or more sensors (similar function, but with greater sensitivity, for example), replacement of a sensor with a different type of sensor, and/or the addition of one or more additional sensors. Upgrading a sensor comprises removing a previous sensor. Processing in the procedure begins at 910. A determination is made if a sensor is to be upgraded or replaced 920. If a sensor is to be replaced or upgraded, the old sensor is removed 930. A new sensor is connected 940, replacing a removed sensor or in addition to original sensors. The sensor interface is configured to support a new type of sensor or additional sensor 950. Parameters for fuzzy logic processing are updated 960. The update of processing parameters can comprise selecting stored parameters for the type of sensor installed and/or entering a learn mode to determine parameters.

Figure 10:
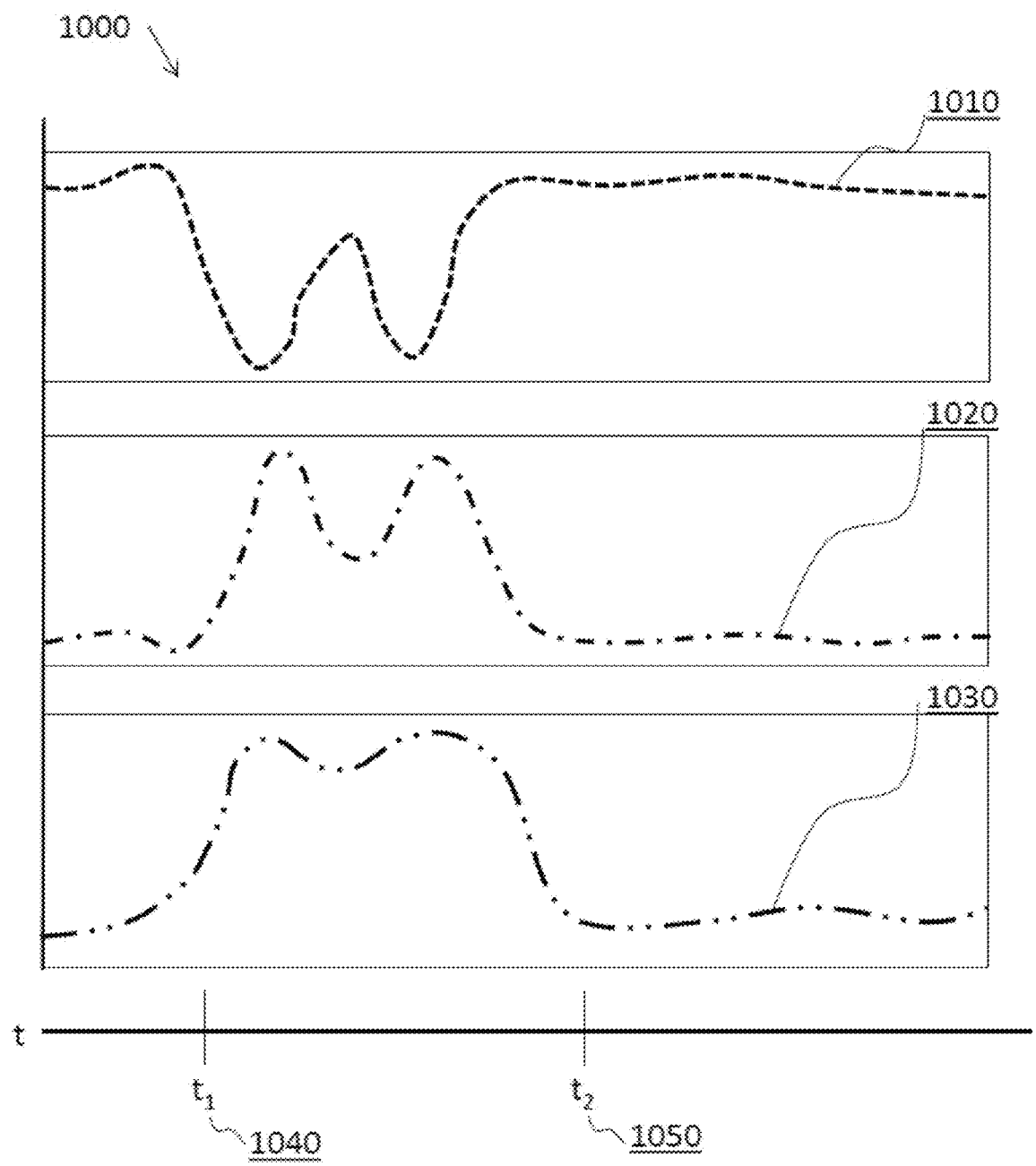
FIG. 10 illustrates selected details of exemplary sensor data acquired over time.

FIG. 10 illustrates selected details of exemplary sensor data acquired over time. Various embodiments employ greater or fewer sensors than exemplified by FIG. 10. Time data 1000 comprises sensor "A" data 1010, sensor "B" data 1020, and Sensor "B" 1030 data acquired during a time interval including when a vehicle passes by the sensors. Some VDS embodiments employ a sensor sample acquisition rate between one and ten samples per second. Slower acquisition rates result in power savings and reduce the requirement for processing power within the SDPU. Various embodiments employ a constant sample rate. Further embodiments employ a variable sample rate. For example, in FIG. 10, the further embodiment employ a first sample rate up to time $t_1$ 1040 at which time a second sample rate is used. Time $t_1$ 1040 indicates a likely presence of a vehicle. Said second sample rate can be higher than said first sample rate to better detect the presence of a vehicle or multiple vehicles and a gap between vehicles, especially if the vehicles are close together. At a later time $t_2$ 1050 it is determined that no vehicles are present within the TSSV, and the sample rate is reduced.

Figure 11:
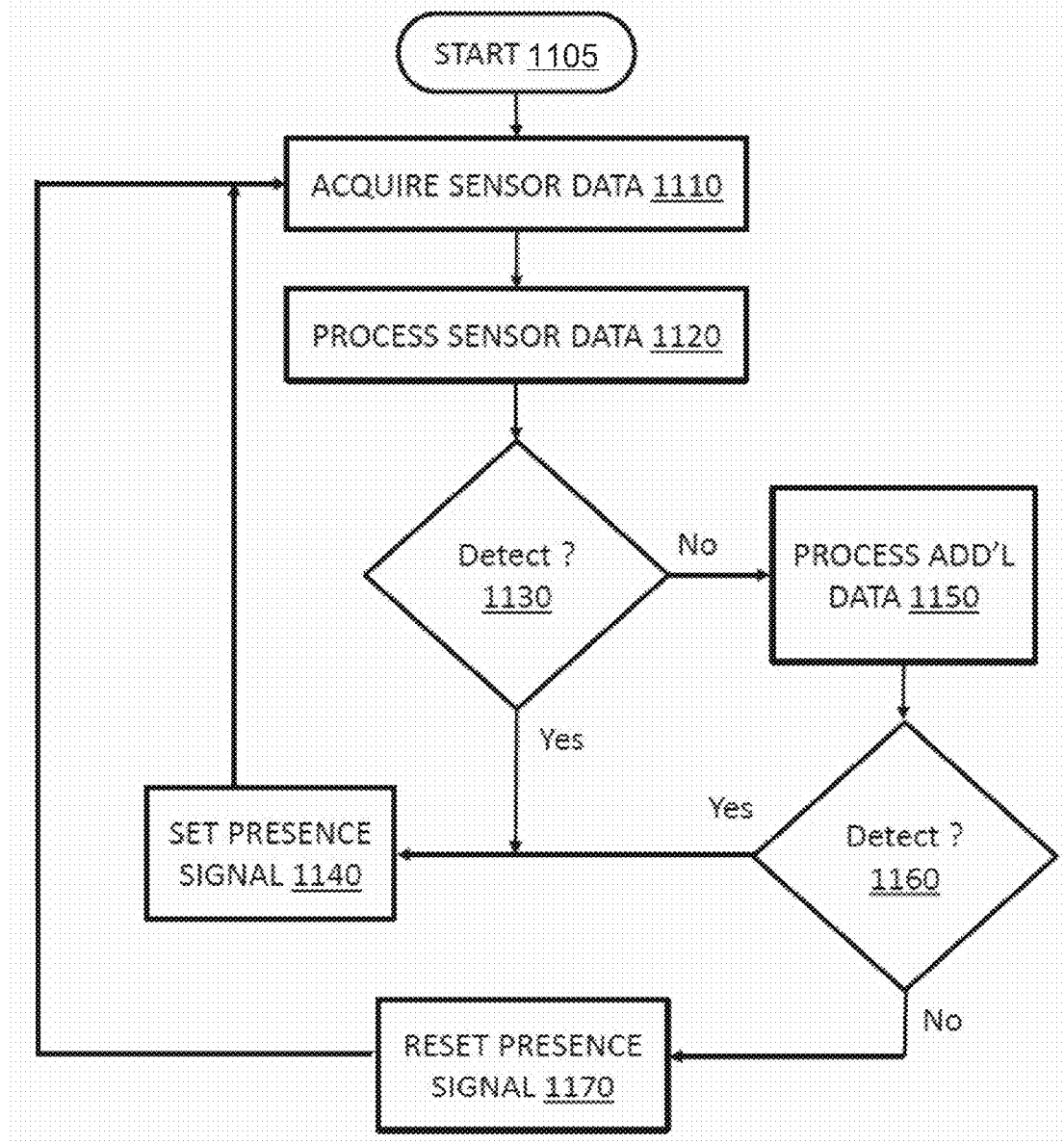
FIG. 11 illustrates, via flowchart, selected details of various embodiments employing selective sensor data processing.

FIG. 11 illustrates, via flowchart, selected details of various embodiments employing a selective sensor data processing procedure 1100. Processing begins at 1105. Sensor data is acquired 1110 and data for a subset of the sensors attached to SDPU is processed 1120. If the data processed provides an indication of vehicle presence within a threshold of likelihood, a presence signal is set 1140 and sensor data is again acquired 1110. If the data processed 1110 does not indicate the presence of a vehicle or in some embodiments, does not provide an indication within a threshold of certainty, data from one or more sensors that are not in said subset of sensors is then processed 1150. If the result of processing 1150 is that a vehicle is present, the presence signal is set and sensor data again acquired. If the result of processing 1150 is that no vehicle has been detected, the presence signal is reset and data again acquired 1110. In some embodiments, sensor data from all sensors is first acquired and then data from a subset of sensors is conditionally processed depending upon results of processing of the data from the subset of sensors. In further embodiments, sensor data from the subset is acquired and then data from remaining sensors is acquired and processed conditionally depending on results of processing of the data from the subset of sensors.

Figure 12:
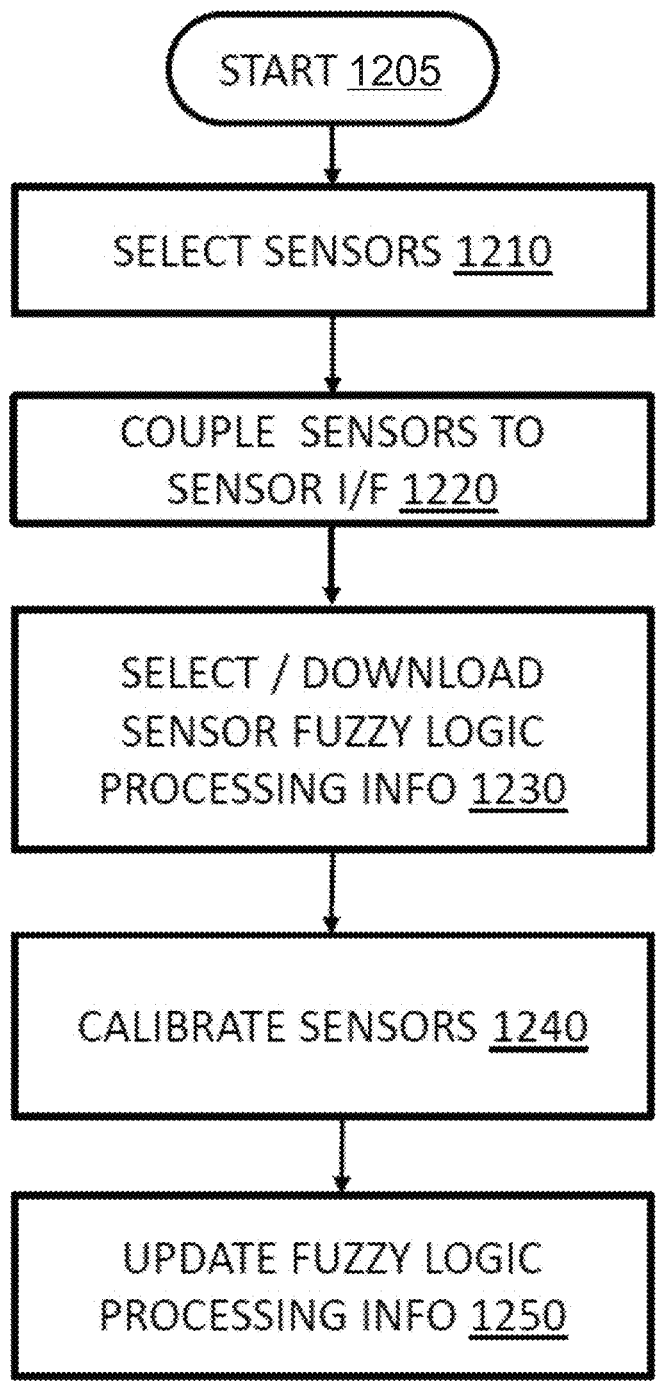
FIG. 12 illustrates, via flowchart, selected details of some embodiments for attaching and configuring sensors for operation with the VDS.

FIG. 12 illustrates, via flowchart, selected details of some embodiments for a procedure that includes attaching and configuring sensors for operation with the VDS 1200. Processing begins at 1205. A list of supported sensors is supplied to an end user from which the end user can select one or more sensors suited to the particular application of the VDS 1210. The list of sensors can include information describing sensing capability, distance range of sensors, interoperability of sensors including sensor types that offer various levels of detection accuracy when operated in conjunction with each other and accuracy dependence upon varying environmental conditions such that one or a plurality of sensors used in combination can be selected 1220 to provide a desired accuracy of detection. Sensors are then coupled 1230 to the sensor interface of the sensor data processing unit (SDPU 500). Sensors are then calibrated 1240 to reflect the sensor response in the installed operating environment. Calibration can include taking multiple readings of sensor outputs over a period of time, such as over a 24 hour period, for example. Calibration information is used to update 1250 fuzzy logic processing information. Advantageously, various embodiments allow an end user to select one or more sensors of similar or different types and test operation of the VDS in varying conditions such that a configuration that provides a desired level of accuracy at a minimized cost can be achieved.

In some embodiments, the SDPU is coupled to a network either directly or through a POS or other type of system, and the SDPU stores performance information regarding sensor data and processing thereof. The network connection permits remote monitoring of performance information and maintenance operations including, but not limited to, adjusting sensor levels (such as adjusting levels in sensor interface 530, for example), modifying sensor weighting and/or other fuzzy logic processing parameters, performing software updates, calibration of sensors, and indicating sensors that are not performing in a desired manner, for example.

In some embodiments, the operating software of SDPU is operable to modify processing parameters as conditions change throughout a day or other interval. Conditions include but are not limited to, light levels, temperature, and temporal information such as time of day, day, day of week, or month for example. Additional embodiments provide modified processing parameters and recalibration of sensors to provide an adaptive solution to varying conditions. For example, sensors may be recalibrated at regular intervals throughout a day and calibration information may be employed to modify fuzzy logic processing information.

In certain embodiments, the operating software of SDPU is operable to place the unit in a low power mode during specified times of day during specified days of the week.

In various embodiments, power to operate the VDS is provided at least in part by a solar panel mounted on or nearby the premises of use of the VDS.

Example Implementation Techniques

In some embodiments, various combinations of all or portions of operations performed by the VDS is performed by another system, such as but not limited to, a POS system, a desktop computer, a laptop computer, a pad computer, for example. In some embodiments, all or portions of the instructions executed by a VDS are supplied from a LAN interface.

In some embodiments, various combinations of all or portions of operations as described by a computer readable medium having a set of instructions stored therein, are performed by execution and/or interpretation of one or more program instructions, by interpretation and/or compiling of one or more source and/or script language statements, or by execution of binary instructions produced by compiling, translating, and/or interpreting information expressed in programming and/or scripting language statements. The statements are compatible with any standard programming or scripting language (such as C, C++, Fortran, Pascal, Ada, Java, VBscript, and Shell). One or more of the program instructions, the language statements, or the binary instructions, are optionally stored on one or more transitory, non-transitory, or a combination of transitory and non-transitory computer readable storage medium elements. In various embodiments some, all, or various portions of the program instructions are realized as one or more functions, routines, sub-routines, in-line routines, procedures, macros, or portions thereof.

Fuzzy Logic Processing

Fuzzy logic allows processing of one or more multi-valued (non-binary, real number) inputs to generate a crisp output value. Briefly, for various embodiments discussed in the present disclosure, the fuzzy logic processing comprises any number of the following acts:

1) Define a set of "membership functions" for each input to the system. These membership functions define the ranges of possibilities for the input.
2) Map the relevant input for each membership function to a truth value between 0 and 1. The truth value indicates the degree of membership of the input. This is called fuzzification and maps mathematical input values into fuzzy membership functions.
3) Define the set of rules that use the membership function values to determine one or more fuzzy outputs.
4) Apply the set of rules to the fuzzy membership function values to compute fuzzy output values. In various embodiments, weightings are added to each rule and are used to regulate the degree to which a rule affects the output values.

5) De-fuzzify the fuzzy output values to generate one or more "crisp" output values.

This set of fuzzy logic processing steps can be performed using computer instructions on a CPU, on dedicated hardware, a combination of computer instructions and dedicated hardware operations, or another method of implementation.

In some embodiments, the membership functions, truth value mapping, and set of rules are determined beforehand for sensors likely to be used with the VDS, therein providing a set of initialization values which may be used for processing and that may be later altered through learning, calibration, or other modes of operation of the VDS.

As noted previously, embodiments of the VDS system employ one or more sensors used to detect the presence of a vehicle. Various types of sensors may be used. For example, a laser based (LIDAR) detector can be used. In this type of detector, a laser beam (optionally modulated in some way) is directed toward the TSSV under surveillance. The beam reflected off a vehicle or other object is detected and processed using known interferometry techniques, resulting in a signal indicating the level of reflectance versus distance.

For a laser sensor, a representative membership function is "VEHICLE DETECTED", for example. The degree of membership is computed based on the reflected signal value in the range of distances from 2 to 10 feet (from the order post of the drive through restaurant, for example). This membership truth value has a value between 0 and 1, and is based on a function (linear or non-linear) of the reflected signal value at 2 to 10 feet. Since the laser beam reflected from a vehicle can be highly variable, depending on type of vehicle, color, surface dirt, angle of reflection of the laser beam, and other variables, the choice of the function relating reflectance to membership value can be a complex function determined by physical and environmental attributes of a customer installation and associated field calibration and testing.

Another membership function can be named "FOG", for example. This membership function is an indication that heavy fog is affecting the laser beam (i.e. attenuation). The presence of fog can be indicated by a steady return signal at the distance range 0 to 2 feet, for example (where the variance in time of the return signal is low). This membership truth value has a value between 0 and 1, and can be based on any function (linear or non-linear) of the reflected signal value and its variance at 0 to 2 feet.

Another membership function can be "RAIN/SNOW", for example. The purpose of this membership function is to indicate that rain or snow is affecting the laser beam. Since rain drops or snowflakes affect the laser beam intermittently, the presence of rain or snow can be indicated by a varying return signal at the distance range 0 to 2 feet, for example (where the variance in time of the return signal is high). This membership truth value would has a value between 0 and 1, and can be based on a function (linear or non-linear) of the reflected signal value and its variance at 0 to 2 feet.

In further embodiments, these issues can be addressed using membership functions "PRECIPITATION", indicating the presence of rain or snow or fog, and "VARIANCE", to differentiate between the different types of precipitation. In various further embodiments, there can be different or additional membership functions. For example, there can be a membership function that indicates that the angle of the sun with respect to the laser beam receiver is causing a temporary problem in measuring the laser beam reflectance. There can be another membership function indicating the long term degradation of the laser beam transmitter or receiver. Some of these additional membership functions can be particularly useful in multiple sensor applications, described more fully below.

In the next step of fuzzy processing, the membership function truth values generated as described herein are combined using fuzzy logic rules. These rules may implement decision processing, which for example can take the form of IF-THEN statements operating on sets of membership function values. The rules may also make use of connectives such as AND, OR, and NOT. When applying connectives to membership function truth values, there are several known operators. For example, for fuzzy variables (membership function truth values) x and y, one possible set of connectives can be:

$$\text{NOT } x = (1-x) \tag{1}$$

$$x \text{ AND } y = \text{minimum}(x,y) \tag{2}$$

$$x \text{ OR } y = \text{maximum}(x,y) \tag{3}$$

A different set of connectives might be:

$$\text{NOT } x = (1-x) \tag{4}$$

$$x \text{ AND } y = x*y \tag{5}$$

$$x \text{ OR } y = 1-((1-x)*(1-y)) \tag{6}$$

There are other sets of connective computations that are known in the art and described in literature. These rules can be used to combine the various membership function truth values to generate a fuzzy output value (i.e. an output value between 0 and 1). For example, a rule can be: IF (VEHICLE DETECTED) AND (NOT (FOG)) AND (NOT (RAIN/SNOW)) THEN (VEHICLE SEEN). (The use of the term VEHICLE SEEN is meant to imply that a vehicle may be present based on a laser beam reflectance measurement.)

One final processing step is to use the fuzzy output to generate a "crisp" output. In the present example, this can include applying a threshold to the fuzzy output. The crisp output can simply be a 1 (signifying that a vehicle is believed to be present) if the value of VEHICLE SEEN is greater than a threshold (such as 0.8) and 0 otherwise. The threshold can be adjusted as a way of adjusting the sensitivity of the vehicle detector.

In some embodiments, a second sensor is used in parallel with a first sensor. Advantageously, the two sensors can operate using different techniques such that environmental conditions that would cause problems for one of the sensors will not cause problems for the other sensor. As an example, one sensor can be the laser (LIDAR) sensor described above, and the other sensor can be an ultrasonic sensor. The ultrasonic sensor uses sound waves to measure the distance of a reflecting object using interferometric techniques similar to the LIDAR system above. While laser techniques can be influenced by fog or rain, ultrasonic techniques can operate normally under such conditions. Conversely, while ultrasonic sensors can be influenced by strong outside noise (such as heavy truck traffic nearby), laser sensors would not be affected. For this ultrasonic sensor, a representative membership function can be "VEHICLE SENSED". The degree of membership can be computed based on the reflected signal value in the range of distances from 2 to 10 feet, for example (from the order post of the drive through restaurant). This membership truth value would have a value between 0 and 1, and can be based on any function (linear or non-linear) of the reflected signal value at 2 to 10 feet. Similar to the laser detector, since the ultrasonic signal reflected from a vehicle can be highly variable depending on a number of factors, the choice of the function relating received signal to membership truth value can be a complex function determined by extensive experimentation and field testing.

Another membership function can be "NOISE". This membership function provides an indication that loud environmental noise is affecting the ultrasonic detector. The presence of significant noise can be indicated by the level of the return signal at the distance range 0 to 2 feet. This membership truth value would have a value between 0 and 1, and can be based on any function (linear or non-linear) of the reflected signal value (and possibly its variance) at 0 to 2 feet.

A fuzzy logic rule to generate a fuzzy output for this ultrasonic sensor can be: IF (VEHICLE SENSED) AND (NOT (NOISE)) THEN (VEHICLE HEARD). (The use of the term VEHICLE HEARD is meant to imply that a vehicle may be present based on an ultrasonic measurement.) For this multi-sensor embodiment, the combined fuzzy output can be generated using a fuzzy rule such as: IF (VEHICLE SEEN) OR (VEHICLE HEARD) THEN (VEHICLE PRESENT), for example. In this example, the function used to implement the OR connective can be a non-linear function to effectively give more weight to whichever input (laser-based VEHICLE SEEN or ultrasonic based VEHICLE HEARD) is more reliable (i.e. has a value closer to 1). A more complex rule or set of rules involving the various individual membership functions can be more effective.

In another embodiment, one or more membership functions are defined to detect reduced functionality in one or more sensors. For the laser based sensor, as an example, such reduced functionality can be caused by component aging, reduced operating voltage due to weak battery power, dirt on the lens, and other degradation causes, for example. These degradations typically occur over much longer time frames than the temporary degradations addressed above. Therefore these reduced functionality membership functions can be based on longer term measurements. For example, in the case of the laser based sensor, there can be an additional membership function "DIRTY LENS". This membership function provides an indication that dirt has gradually built up on the lens, affecting the laser beam (i.e. attenuation). The presence of dirt buildup on the lens can be indicated by a gradual reduction over time (on the order of days or weeks) of the average value of VEHICLE DETECTED. This membership truth value has a value between 0 and 1, and can be based on any function (linear or non-linear) of the average value of VEHICLE DETECTED. This membership function truth value can be used as part of the rules determining VEHICLE SEEN or VEHICLE PRESENT. It can also be used to generate an alert that the lens needs to be cleaned.

The non-limiting examples in the present disclosure are intended to convey the concepts of various embodiments, and various other embodiments can use more membership functions and more complex rules. Multi-sensor embodiments are not limited to 2 sensors. A system development platform can comprise MATHWORKS MATLAB Fuzzy Logic Toolbox and an ATMEL SAM D10 microcontroller, for example. The A/D converter and counter of the SAM D10 can be employed to provide at least some of the function of sensor interface 530 described relative to FIG. 5. A microcontroller comprises a central processing unit, memory, and input/output peripherals.

CONCLUSION

Certain choices have been made in the description merely for convenience in preparing the text and drawings and unless there is an express indication to the contrary the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as flash memory technology types; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, operations, functions, routines, sub-routines, in-line routines, procedures, macros, or portions thereof. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The invention is thus to be construed as including modifications and variations encompassed within the scope of the claims of the issued patent.

What is claimed is:

1. A drive through order system, comprising:
   a wired communications device operable to provide two-way communication between the order system and an order taker;
   an integrated circuit having a central processing unit and further having at least one analog input, at least one digital input, and at least one digital output;
   a memory coupled to said central processing unit and configured to store instructions including at least some fuzzy logic processing instructions and data for said central processing unit;
   a first sensor affixed to an immovable object and coupled to said at least one digital input or to said at least one analog input, wherein said first sensor has an immunity to a first environmental condition and a vulnerability to a second environmental condition;
   a second sensor affixed to either the immovable object or to a second immovable object, the second sensor coupled to said at least one digital input or to said at least one analog input, wherein said second sensor has a vulnerability to the first environmental condition and an immunity to the second environmental condition, and
   an output signal, arranged to indicate a presence of a vehicle in a location sensed by said first and second sensors, the output signal operable to be asserted in response to processing of information from at least one of said first and second sensors using said fuzzy logic processing instructions, wherein said fuzzy logic processing instructions are operable to select a variable rate at which information from said first sensor is acquired, said selection based on at least one signal from said second sensor, and wherein upon a determination that no vehicles are present in the location sensed by said first and second sensors, said fuzzy logic processing instructions are operable to select a reduced rate at which information from said first sensor is acquired.

2. The drive through order system of claim 1 wherein said second sensor affixed to either the immovable object or the second immovable object is arranged to sense the presence of the vehicle in a same volume as the first sensor.

3. The drive through order system of claim 2 wherein said instructions are operable to selectively process information from said second sensor only after processing of information from said first sensor fails to indicate the presence or absence of the vehicle in the location to a determined threshold.

4. The drive through order system of claim 2 wherein said first sensor is arranged for replacement by a user with a sensor of the same type.

5. The drive through order system of claim 2 wherein power for said system is provided by at least one of a battery unit, a power supply unit coupled to an electrical grid, and a power supply unit coupled to a solar panel, said solar panel affixed to a third immovable object.

6. The drive through order system of claim 1 wherein said instructions implement a user controlled learn mode operable to modify at least one fuzzy logic processing instruction for said first sensor.

7. The drive through order system of claim 1 wherein said instructions are operable to perform calibration of said first sensor.

8. The drive through order system of claim 1 wherein said instructions further comprise second instructions operable to modify said fuzzy logic processing instructions based on time of day.

9. The drive through order system of claim 1, further comprising:
   a timer operable to be started in response to assertion of said output signal.

10. A method of operating a drive through order system, comprising:
    acquiring first sensor information from a first sensor, said first sensor affixed to an immovable object, wherein said first sensor has an immunity to a first environmental condition and a vulnerability to a second environmental condition;
    acquiring second sensor information from a second sensor, said second sensor affixed to the immovable object or to a second immovable object, wherein said second sensor has a vulnerability to the first environmental condition and an immunity to the second environmental condition;
    processing said first and second sensor information in a central processing unit employing first fuzzy logic processing instructions to detect a presence or an absence of a vehicle in a location sensed by said first and second sensors, wherein said first fuzzy logic processing instructions are executed to select a variable rate at which information from said first sensor is acquired, said selection based on at least one signal from said second sensor, and wherein upon a determination that no vehicles are present in the location sensed by said first and second sensors, said first fuzzy logic processing instructions are executed to select a reduced rate at which information from said first sensor is acquired; and
    selectively asserting an indicator signal in dependence upon said processing.

11. The method of claim 10, wherein said second sensor affixed to either the immovable object or the second immovable object arranged to sense the presence of the vehicle in a same volume as the first sensor.

12. The method of claim 11 wherein said processing of said second sensor information is selectively performed in dependence upon a result of said processing of said first sensor information.

13. The method of claim 11, further comprising:
    processing said second sensor information in said central processing unit employing second fuzzy logic processing instructions; and
    modifying said second fuzzy logic processing instructions in dependence upon time of day information.

14. The method of claim 11, further comprising:
    acquiring said second sensor information at a first rate in response to said indicator signal not having been asserted within a first predefined time period; and acquiring said second sensor information at a second rate in response to said indicator signal having been asserted within a second predefined time period.

15. A non-transitory computer readable medium having instructions stored thereon, that when said instructions are executed by a processor, perform a method to indicate a presence of a vehicle within a terrestrially static sample volume, the method comprising:
  acquiring information from at least one sensor affixed to an immovable object and coupled to said microcontroller, wherein said at least one sensor has an immunity to a first environmental condition and a vulnerability to a second environmental condition;
  acquiring second information from a second sensor, said second sensor affixed to the immovable object or to a second immovable object, wherein said second sensor has a vulnerability to the first environmental condition and an immunity to the second environmental condition;
  processing said information using fuzzy logic instructions to detect the presence or an absence of a vehicle within the terrestrially static sample volume, wherein said fuzzy logic instructions are executed to select a variable rate at which information from said first sensor is acquired, said selection based on at least one signal from said second sensor, and wherein upon a determination that no vehicles are present within the terrestrially static sample volume, said fuzzy logic instructions are executed to select a reduced rate at which information from said first sensor is acquired; and
  selectively asserting an indicator signal in dependence upon said processing.

16. The medium of claim 15 having instructions to perform the method, wherein said second sensor affixed to either the immovable object or the second immovable object is arranged to sense the presence of the vehicle in a same volume as the first sensor.

17. The medium of claim 15 having instructions to perform the method, the method further comprising:
  periodically calibrating said at least one sensor.

18. The medium of claim 15 having instructions to perform the method, the method further comprising:
  performing a learning mode, the learning mode including:
    acquiring first information from said at least one sensor in response to a user input;
    acquiring third information from said at least one sensor in response to a second user input; and
    modifying at least one of said fuzzy logic instructions in dependence upon said first information and said third information.

19. The medium of claim 15 having instructions to perform the method, the method further comprising:
  modifying said fuzzy logic instructions in dependence upon time of day information.

* * * * *